Patented June 19, 1928.

1,674,216

UNITED STATES PATENT OFFICE.

FRANKLIN S. MORTIMER, OF BLOOMINGTON, ILLINOIS, AND RAY W. HESS, OF BUFFALO, NEW YORK, ASSIGNORS TO NATIONAL ANILINE & CHEMICAL CO., INC., OF NEW YORK, N. Y., A CORPORATION OF NEW YORK.

PURIFICATION OF N-ALKYLCARBAZOLES.

No Drawing.   Application filed June 17, 1925. Serial No. 37,841.

This invention relates to a process for the purification of N-alkylcarbazoles, and particularly for the separation of N-ethylcarbazole from impurities which contain carbazole, anthracene, and similar compounds.

N-ethylcarbazole, when made from crude carbazole, frequently contains anthracene, and possibly phenanthrene and other coal tar products, as well as some carbazole, as impurities. The amount of these impurities may run as high as 10 to 50 percent, or higher, and are difficult or impossible to separate from ethylcarbazole by crystallization from solvents or by distillation either at ordinary or reduced pressures.

According to the present invention, we have found that sulfuric acid of particular strengths will dissolve ethylcarbazole without substantially dissolving carbazole, anthracene or the other similar impurities which are found associated with ethylcarbazole. The present invention accordingly contemplates a process of purifying impure ethylcarbazole by extraction of the ethylcarbazole from impurities by means of sulfuric acid of certain definite concentrations.

At 0° C. ethylcarbazole is substantially insoluble in 74 to 75 percent sulfuric acid but above this strength the solubility increases rapidly, and in about 83 to 84 percent sulfuric acid ethylcarbazole is soluble to the extent of about 20 percent. Carbazole does not begin to become soluble to any appreciable extent in sulfuric acid at 0° C. until the concentration approaches about 87 percent. We have found that at 10° C. the solubilities are somewhat similar except that the solubility of carbazole is slightly increased. Anthracene and similar hydrocarbons are substantially insoluble or unattacked by sulfuric acid at low temperatures unless the concentration rises to about 90 percent or higher. The process of the present invention may be carried on at temperatures as high as 25° C. but since the rate of sulfonation of ethylcarbazole begins to become apparent at this temperature it is necessary under these conditions to carry out the extraction expeditiously as on standing in contact with the acid for any considerable period of time, for example, an hour or more, the losses of ethylcarbazole by sulfonation begin to be appreciable. A half-hour usually gives satisfactory results. Below 10° C. there is substantially no sulfonation of the ethylcarbazole even though it remains in contact with the acid for several hours. We have found that 10° C. is a satisfactory temperature to use as it permits a rapid solution of the ethylcarbazole with substantially quantitative yield and does not dissolve noticeable amounts of anthracene, carbazole, etc.

In its broader aspects, the present invention covers processes of purifying ethylcarbazole by dissolving it in sulfuric acid of strengths between about 77 and 87 percent at temperatures below 25° C. More particularly the invention is directed to dissolving out ethylcarbazole by means of sulfuric acid of a strength of about 81 to 85 percent, preferably about 83 to 84 percent, at temperatures preferably not higher than 10° C.

The lower limit for temperature is determined by the freezing point of the particular acid or of the solution of ethylcarbazole in the particular strength of acid. However, the solubility decreases as the temperature decreases and it is therefore not economically advantageous to use temperatures much below 0° C. It should, however, be understood that the invention is not limited to the use of temperatures between 0° and 25° C. but covers processes in which temperatures are used down to the freezing point of the particular acid or solution being employed.

In case carbazole is present as an impurity, it may be further pointed out that the best purification appears to be effected when the amount of anthracene present in the crude ethylcarbazole is approximately equal to or greater than the amount of carbazole; and if such an amount of anthracene compared to the carbazole is not present then it is preferable to add anthracene to the crude ethylcarbazole sufficient to give this proportion and fuse the mixture before carrying out the purification. If carbazole is absent, the addition of anthracene may be omitted.

The following specific examples will further illustrate the invention, but it will be understood that the invention is not limited thereto.

Example 1: Crude ethylcarbazole containing about 50 percent ethylcarbazole, 25 percent carbazole, and 25 percent anthracene, ground to a finely divided powder, is treated with about twenty times its weight of 81 percent sulfuric acid at about 0°C. The mixture is thoroughly agitated for about one-half to three hours depending on the fineness of division of the crude product. The solution is then filtered cold by means of an acid resisting filter. The filtrate is diluted with ice-water until substantially no further precipitation takes place. The precipitate, which comprises purified ethylcarbazole, is filtered off, thoroughly washed with water to remove adhering acid, and dried. The drying may be advantageously carried out at about 60° C. and should in general be carried out below 80° C. In order to prevent losses by sublimation, lower temperatures may be used particularly in connection with vacuum drying.

Example 2: Crude ethylcarbazole, containing abuot 91 percent ethylcarbazole and between 7 and 8 percent of a mixture of anthracene and carbazole, is ground to a finely divided powder. The powdered product is then treated with about seven times its weight of 83 percent sulfuric acid. The treatment is carried on with vigorous agitation for about one-half to three hours at about 10° C. The solution is then filtered through an acid-proof filter, the residue washed with its weight of 83 percent sulfuric acid, and the combined filtrate and washings diluted with ice-water whereupon ethylcarbazole precipitates out. After filtering and thoroughly washing the precipitate with water, the ethylcarbazole may be dried. The yield is practically quantitative.

Example 3: Crude ethylcarbazole containing about 82 percent ethylcarbazole, 9 per cent carbazole and about 9 per cent anthracene is ground to a finely divided form and agitated with about ten times its weight of about 83 percent sulfuric acid for about one-quarter to one-half hour. The temperature is maintained at about 25° C. by suitable cooling means. The solution is then filtered through an acid proof filter and the filtrate diluted with water, ice being present, which causes ethylcarbazole to precipitate out. The precipitate is then filtered and washed well with water to remove traces of acid and dried at about 60° C.

Somewhat higher temperatures than 25° C. may be used in the purification of ethylcarbazole but as the rate of sulfonation increases quite rapidly above 25° C., such temperatures are less advantageous. But if the time of contact is kept very short, which is only possible with a fine subdivision of product and very vigorous agitation, a fairly good separation may be effected.

Example 4: Finely powdered crude ethylcarbazole containing about 10 to 20 percent anthracene is agitated with about 10 times its weight of 83 to 84 percent sulfuric acid at 0°–10° C. for about one-half to two hours, or until the ethylcarbazole has become dissolved. The solution is then filtered and the filtrate poured into ice-water and the precipitated ethylcarbazole filtered off and washed thoroughly with water.

Example 5: Crude ethylcarbazole containing about 5 percent of carbazole and substantially no anthracene is mixed with about 5 to 6 percent of anthracene and the mixture fused. It is then cooled, ground to a fine powder and then treated with about 10 times its weight of about 83 percent sulfuric acid at 0°–10° C. for one-half to two hours. The solution is then filtered and the filtrate poured into cold water whereupon purified ethylcarbazole is precipitated. It is filtered off and washed well with water.

Other impure N-alkylcarbazoles, for example, N-methylcarbazole, may be purified in a similar manner.

We claim:

1. A process of purifying impure N-alkylcarbazole which comprises extracting the same with sulfuric acid at a temperature not exceeding about 25° C. and of about 77 to 87 percent strength, and recovering the N-alkylcarbazole from the filtrate.

2. A process of purifying impure N-ethylcarbazole which comprises dissolving out the ethylcarbazole from the same with sulfuric acid at a temperature not exceeding about 25° C. and of a concentration between 77 and 87 percent.

3. A process of purifying impure N-ethylcarbazole which comprises dissolving out the ethylcarbazole from the same by means of sulfuric acid at a temperature not exceeding about 25° C. and of about 83 to 84 percent strength.

4. A process of purifying impure N-ethylcarbazole which comprises dissolving out the ethylcarbazole by means of sulfuric acid between 77 and 87 percent strength at a temperature below 25° C.

5. A process of purifying impure N-ethylcarbazole which comprises dissolving out the ethylcarbazole with sulfuric acid of about 83 to 84 percent strength at temperatures below 25° C.

6. A process of purifying impure N-ethylcarbazole which comprises dissolving out the ethylcarbazole with sulfuric acid of a strength between 77 and 87 percent at a temperature of about 10° C.

7. A process of purifying impure N-ethylcarbazole which comprises dissolving out the ethylcarbazole with sulfuric acid of about 83 to 84 percent strength at a temperature of about 10° C.

8. A process of purifying impure N-ethylcarbazole which comprises treating the same with about five to twenty times its weight of sulfuric acid at a temperature not exceeding about 25° C. and between 77 and 87 percent strength, filtering and recovering the N-ethylcarbazole from the filtrate.

9. A process of purifying impure N-ethylcarbazole which comprises treating the same with about five to twenty times its weight of sulfuric acid of a strength between 77 and 87 percent at a temperature below 25° C., filtering the solution and recovering N-ethylcarbazole from the filtrate.

10. A process of purifying impure N-ethylcarbazole which comprises treating the same with about five to twenty times its weight of sulfuric acid of a strength between 83 to 84 percent at a temperature below 25° C., filtering the solution and recovering N-ethylcarbazole from the filtrate.

11. A process of purifying impure N-ethylcarbazole which comprises treating the same with about five to twenty times its weight of sulfuric acid at a temperature not exceeding about 25° C. and of a strength between 77 and 87 percent, filtering, diluting the filtrate with water until the ethylcarbazole is substantially completely precipitated out, filtering off the liquor, washing the ethylcarbazole and drying the washed product.

12. A process of purifying impure N-ethylcarbazole which comprises treating the same with about five to twenty times its weight of sulfuric acid at a temperature not exceeding about 25° C. and of a strength about 83 to 84 percent, filtering, diluting the filtrate with water until the ethylcarbazole is precipitated out, filtering off the liquor, washing the N-ethylcarbazole and drying the washed product.

13. A process of purifying impure N-ethylcarbazole containing about equal amounts of carbazole and anthracene as impurities which comprises grinding the same, treating with sulfuric acid of about 77 to 87 percent at a temperature of about 0°–10° C., filtering, diluting the filtrate with water until ethylcarbazole is substantially all precipitated, filtering and washing the N-ethylcarbazole with ice-water, and drying the ethylcarbazole at below 80° C.

14. A process of purifying impure N-ethylcarbazole containing about equal amounts of carbazole and anthracene as impurities which comprises treating the same with sulfuric acid of about 83 to 84 percent at a temperature of about 0° to 10° C., filtering, diluting the filtrate with water until substantially all of the ethylcarbazole is precipitated, filtering, washing the N-ethylcarbazole with water, and drying the ethylcarbazole at below 80° C.

15. In the purification of an impure N-alkylcarbazole which contains carbazole as an impurity by extracting the same with sulfuric acid of about 77 to 87 percent strength and at a temperature of about 0° to 25° C., a process which comprises incorporating with the impure N-alkylcarbazole, and before effecting its purification, an amount of anthracene sufficient to provide the presence of at least as much of it as of carbazole.

16. In the purification of an impure ethylcarbazole which contains carbazole as an impurity by extracting the same with sulfuric acid of about 77 to 87 percent strength and at a temperature not to exceed about 25° C., a process which comprises the addition to the impure ethylcarbazole, and before effecting the purification, of anthracene in an amount sufficient to provide the presence of approximately as much of it as of carbazole, and fusing the mixture.

In testimony whereof we affix our signatures.

FRANKLIN S. MORTIMER.
RAY W. HESS.